United States Patent
Bussa et al.

(10) Patent No.: US 9,697,138 B2
(45) Date of Patent: *Jul. 4, 2017

(54) IDENTIFYING STALE ENTRIES IN ADDRESS TRANSLATION CACHE

(71) Applicant: International Business Machines Corporation, Armonk, NY (US)

(72) Inventors: Vinod Bussa, Hyderabad (IN); Manoj Dusanapudi, Bangalore (IN); Shakti Kapoor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/407,126

(22) Filed: Jan. 16, 2017

(65) Prior Publication Data

US 2017/0161208 A1    Jun. 8, 2017

Related U.S. Application Data

(63) Continuation of application No. 15/247,381, filed on Aug. 25, 2016, which is a continuation of application No. 14/956,789, filed on Dec. 2, 2015.

(51) Int. Cl.
   *G06F 12/10*     (2016.01)
   *G06F 12/1045*   (2016.01)
   *G06F 12/128*    (2016.01)
   *G06F 12/0808*   (2016.01)
   (Continued)

(52) U.S. Cl.
   CPC ...... *G06F 12/1045* (2013.01); *G06F 12/0808* (2013.01); *G06F 12/1009* (2013.01); *G06F 12/1027* (2013.01); *G06F 12/128* (2013.01); *G06F 2212/621* (2013.01); *G06F 2212/65* (2013.01); *G06F 2212/68* (2013.01); *G06F 2212/69* (2013.01)

(58) Field of Classification Search
   None
   See application file for complete search history.

(56) References Cited

U.S. PATENT DOCUMENTS

| 5,740,353 A | 4/1998 | Kreulen et al. |
| 6,260,130 B1 | 7/2001 | Liedtke |
| 7,080,220 B2 | 7/2006 | Dunshea et al. |

(Continued)

OTHER PUBLICATIONS

Bussa et al., "Identifying Stale Entries in Address Translation Cache," U.S. Appl. No. 14/956,789, filed Dec. 2, 2015.

(Continued)

*Primary Examiner* — Kaushikkumar Patel
(74) *Attorney, Agent, or Firm* — Joseph W. Cruz

(57) ABSTRACT

A mapping may be changed in a table stored in memory. The table may map a first set of addresses, for a set of data, to a second set of addresses. The changing of the mapping may including mapping the first set of addresses to a third set of addresses. In response to the changing of the mapping, one or more flush operations may be executed to invalidate one or more entries within one or more address translation caches. The one or more entries may include the second set of addresses. In response to the executing of the one or more flush operations, a first test case may be run. The first test case may be to test whether any of the first set of addresses are mapping to the second set of addresses.

1 Claim, 5 Drawing Sheets

(51) Int. Cl.
*G06F 12/1009* (2016.01)
*G06F 12/1027* (2016.01)

(56) References Cited

U.S. PATENT DOCUMENTS

| | | | |
|---|---|---|---|
| 7,389,400 | B2 | 6/2008 | Corrigan et al. |
| 7,797,650 | B2 | 9/2010 | Bag et al. |
| 7,822,942 | B2 | 10/2010 | Corrigan et al. |
| 8,095,771 | B2 | 1/2012 | Sheu et al. |
| 8,694,712 | B2 | 4/2014 | Sheu et al. |
| 9,081,707 | B2 | 7/2015 | Conrad et al. |
| 9,213,651 | B2 | 12/2015 | Malyugin et al. |
| 2008/0215848 | A1 | 9/2008 | Sheu et al. |
| 2008/0222384 | A1 | 9/2008 | Wang et al. |
| 2009/0024892 | A1 | 1/2009 | Bussa et al. |
| 2009/0070546 | A1 | 3/2009 | Choudhury et al. |
| 2009/0070632 | A1* | 3/2009 | Bag ............... G06F 11/26 714/42 |
| 2010/0011248 | A1 | 1/2010 | Bussa et al. |
| 2013/0346046 | A1 | 12/2013 | Rompaey et al. |
| 2014/0122830 | A1 | 5/2014 | Cohen et al. |
| 2015/0100738 | A1 | 4/2015 | Wang et al. |
| 2015/0127984 | A1 | 5/2015 | Alapati et al. |

OTHER PUBLICATIONS

Bussa et al., "Identifying Stale Entries in Address Translation Cache," U.S. Appl. No. 15/247,381, filed Aug. 25, 2016.
Accelerated Examination Support Document dated Aug. 22, 2016 for U.S. Appl. No. 15/247,381, 15 pages.
Bussa et al., "Identifying Stale Entries in Address Translation Cache," U.S. Appl. No. 15/407,135, filed Jan. 16, 2017.
Accelerated Examination Support Document dated Jan. 16, 2017 for U.S. Appl. No. 15/407,135, 17 pages.
List of IBM Patents or Patent Applications Treated as Related, signed Jan. 16, 2017, 2 pages.

* cited by examiner

| Test Case ID | Description | Preconditions | Steps | Expected Results | Actual Results |
|---|---|---|---|---|---|
| 1A | Identify a 1st set of RPNs for a 1st set of virtual addresses | System should be in virtual mode | 1. access 1st set of virtual addresses<br>2. identify the set of RPNs for each of the 1st set of virtual addresses | Each of the 1st set of virtual addresses should map to the 1st set of RPNs | Each of the 1st set of virtual addresses mapped to the 1st set of RPNs |
| 1B | Identify a 2nd set of RPNs for the same (1st) set of virtual addresses | 1. 1st set of RPNs for the 1st set of virtual addresses should have been changed to a 2nd set of RPNs<br>2. A TLB flush operation should have occurred for each of the 1st set of RPNs | 1. access 1st set of virtual addresses<br>2. identify the set of RPNs for each of the 1st set of virtual addresses | None of the 1st set of virtual addresses should map to the 1st set of RPNs, but map to the 2nd set of RPNs | one of the 1st set of virtual addresses X mapped to the first set of RPNs |

FIG. 5

IDENTIFYING STALE ENTRIES IN ADDRESS TRANSLATION CACHE

BACKGROUND

This disclosure relates generally to virtual memory systems, and more specifically, to identifying one or more stale entries in an address translation cache within such systems.

Processors may operate in physical or virtual mode. In physical mode, any requested memory address may directly correlate with a physical address within actual system memory (i.e., main memory) without address translation. In virtual mode, any requested memory address may be translated from a virtual address (including an effective address) to a physical address. In virtual mode, when an address is requested, the operating system may determine if the virtual address is located within a page table of the main memory. The page table may store various mappings of virtual addresses to physical addresses as page table entries (PTEs). Accordingly, if the virtual address is located within the page table, a physical address may be obtained.

Because page table lookup may be expensive, a translation cache (e.g., Translation Lookaside Buffer (TLB)) may help data access become more efficient. For every data request, a first set of accesses to main memory may have to occur for data fetching and a second set of accesses to main memory may have to occur for address translation within a page table. An address translation cache, such as a TLB, may help reduce data access cost by bringing translation lookup closer to the processor, thereby reducing translation latency. A TLB is a specialized type of cache within the processor that retains recently-accessed page address translations (i.e., virtual to physical address translations). For a given data request, a search for the data may begin in the processor at the TLB. When a corresponding entry is not found within the TLB, the operating system may then search the main memory within the page table for the corresponding entry.

SUMMARY

One or more embodiments are directed to a computer-implemented method, a system, and/or a computer program product for identifying stale entries within an address translation cache. A mapping may be changed in a table stored in memory. The table may map a first set of addresses, for a set of data, to a second set of addresses. The changing of the mapping may including mapping the first set of addresses to a third set of addresses. In response to the changing of the mapping, one or more flush operations may be executed to invalidate one or more entries within one or more address translation caches. The one or more entries may include the second set of addresses. In response to the executing of the one or more flush operations, a first test case may be run. The first test case may be to test whether any of the first set of addresses are mapping to the second set of addresses.

BRIEF DESCRIPTION OF THE DRAWINGS

FIG. 5 is a diagram of an example of two test cases, according to embodiments.

Figure 1:
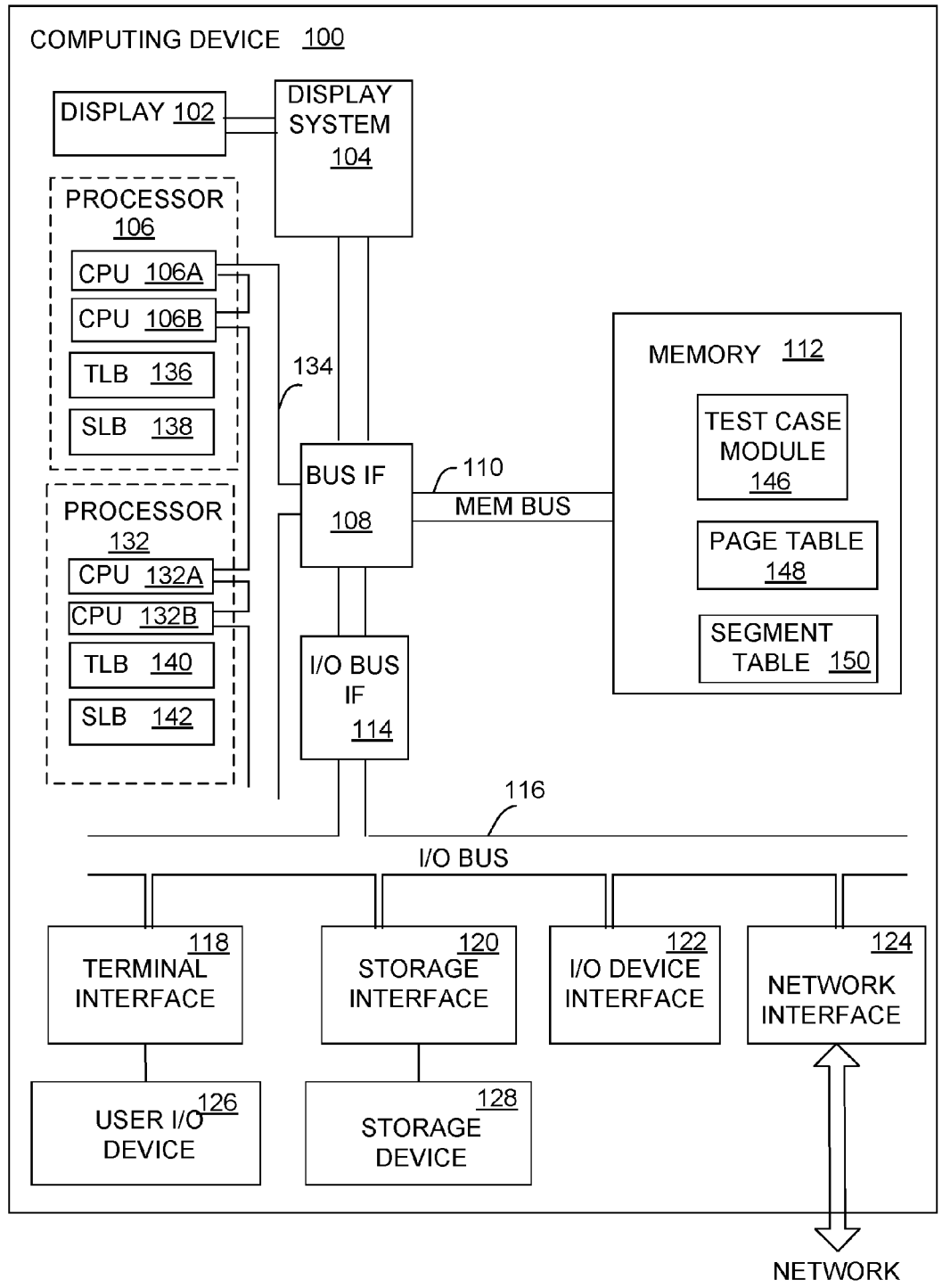
FIG. 1 is a block diagram illustrating an example computing device, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtual memory systems, more particular aspects relate to identifying one or more stale entries in an address translation cache within such systems. While the present disclosure is not necessarily limited to such applications, various aspects of the disclosure may be appreciated through a discussion of various examples using this context.

An operating system and/or processor (e.g., a memory management unit (MMU)) may issue one or more flush operations to invalidate (remove) stale entries from an address translation cache. Flush operations are also known as "kill" (e.g., TLB kill), "invalidate," or "shootdown" (e.g., TLB shootdown) operations. Flushing or invalidating stale entries may occur by setting all valid bits to 0 to indicate that the entries are no longer valid for address translation. A "stale" entry as described herein is an entry within address translation cache (e.g., TLB) that is no longer valid for address translation (e.g., effective-to-physical address translation). Accordingly, the stale entry may correspond to an invalid or old address mapping.

A context switch may lead to address translation caches containing stale entries. A context switch as disclosed herein may be an address space (e.g., virtual or effective) that switches or changes address mappings because of a changed process or logical partition. Consequently, when switching from one process or logical partition to another, the hardware and/or operating system should ensure that the about-to-be-run process does not accidently utilize address translations within address translation cache from some previously run process or logical partition. For example, when one process (P1) is running, it may assume the TLB might be caching translations that are valid for it (i.e., translations that come from P1's page table). The 10th virtual page of P1 may be mapped to physical frame 100. If another process (P2) exists, the operating system may perform a context switch and consequently, the 10th virtual page of P2 may be mapped to physical frame 170. However, the $10^{th}$ virtual page may map to two different physical frames (100 and 170), because of a stale entry within the TLB (physical frame 100), but the hardware may not be able to distinguish which entry is stale and may therefore map to the wrong physical frame. One method to deal with this is to simply flush out all or some of the entries in the TLB. In another example, a hypervisor may perform a context switch between logical partitions.

One or more stale entries may be flushed out of a TLB for various other reasons other than a context switch. For example, when a virtual page is paged out to disk, the PTE in the page table may be marked as not present. If that page still has a TLB entry, it may be marked as stale (assuming that the TLB includes only present PTEs). In another example, a process may map a file into memory, access a few pages in the mapped area, and then unmap the file. Even after the unmapping, the TLB may still include entries that were inserted when the mapped area was accessed, but because the mapping no longer exists, those entries may be stale.

In a multiprocessor system (e.g., Symmetric Multiprocessing System (SMP)), each processor may include its own shared address translation cache and whenever there is a change in address mapping due to, for example a context switch, each processor (or processor core) may have to synchronize its TLB and page table with the other TLBs and page tables to reflect the change. For example, when a mapping change happens at a first address associated with a first process, a first processor (performing the first process) may perform the change, flag a flush request at a shared memory location, and then trigger an Inter-Processor Interrupt (IPI) to other processors. When those processors receive the interrupt, they may flush one or more associated entries within their own TLB cache, and acknowledge that the request has been completed. The first processor may have to wait until all processors acknowledge the completion.

Each processor (or processor core) may issue these flush operations simultaneously or substantially simultaneous. However, when flush operations are performed simultaneously, they may become lost in the interconnect fabric, thereby causing stale entries to remain within the address translation cache. In addition, there may be a significant time difference for various cores of various processors to receive and acknowledge the flush operation because of proximity of the core that issued a flush operation with other cores that need to receive the flush operation message. For example, in a system that includes 256 cores, core 0 may issue a first TLB flush operation for a first address and the communication may take longer to reach core 256 than core 1. However, core 256 may have issued its own second TLB flush operation for a second address at substantially the same time as it receives an instruction from core 1 to invalidate the first address based on the first TLB flush. However, because the first TLB flush operation may be processed at substantially the same time as the second TLB flush operation and because there may be no priority scheme (or other locking mechanism) in place, the TLB entry corresponding to the first address may not be invalidated from core 256's TLB. This example illustrates a race condition. A race condition may occur when a system attempts to perform operations at the same time or substantially the same time, but the operations may be performed in an unintended order or not performed at all, thereby causing a system bug (e.g., maintaining a stale entry within a TLB). Accordingly, embodiments of the present disclosure are directed to identifying stale entries within an address translation cache in an efficient manner.

FIG. 1 is a block diagram illustrating an example computing device, according to embodiments. The components of the computing device 100 can include one or more processors 106 and 132, a memory system 112, a terminal interface 118, a storage interface 120, an Input/Output ("I/O") device interface 122, and a network interface 124, all of which are communicatively coupled, directly or indirectly, for inter-component communication via a memory bus 110, a processor bus 134, an I/O bus 116, bus interface unit ("IF") 108, and an I/O bus interface unit 114.

The computing device 100 may include one or more general-purpose programmable central processing units (CPUs) 106A, 106B, 132A, and 132B, herein generically referred to as the processors 106 and 132. In some embodiments, each of the CPUs (106A, 106B, 132A, and 132B) may be individual processor cores. In an embodiment, the computing device 100 may contain multiple processors; however, in another embodiment, the computing device 100 may alternatively be a single CPU device. Each processor executes instructions stored in the memory system 112.

In some embodiments, each processor may include a memory management unit (MMU) that includes a TLB and a Segment Lookaside Buffer (SLB), both of which may be address translation caches. For example, processor 106 may include TLB 136 and SLB 138 and processor 132 may include TLB 140 and SLB 142. The SLBs may be utilized for mapping effective addresses to virtual addresses and the TLBs may be utilized for mapping virtual addresses to physical addresses such that address translation may occur, as described in more detail below.

The computing device 100 may include a bus interface unit 108 to handle communications among the processors 106 and 132, the memory system 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106 and/or 132. In addition, one or more of the functions provided by the bus interface unit 108 may be on board an integrated circuit that also includes the processor 106 and/or 132.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of data within the memory system 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory system 112, the bus interface 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the I/O bus 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device. In some embodiments, the computing device 100 is a Symmetric Multiprocessing System (SMP). An SMP may be a system that includes two or more processors (e.g., processors 106 and 132) that share a memory and an operating system instance. An SMP's processors may perform multiple processes simultaneously.

In an embodiment, the memory system 112 may include a random-access semiconductor memory, storage device, or storage medium (either volatile or non-volatile) for storing or encoding data and programs. In another embodiment, the memory system 112 represents the entire virtual memory of the computing device 100, and may also include the virtual memory of other computer systems coupled to the computing device 100 or connected via a network 130. The memory may be a single monolithic entity, but in other embodiments the memory system 112 may include a hierarchy of caches and other memory devices. For example, memory may exist in multiple levels of caches, and these caches may be further divided by function, so that one cache holds instructions while another holds non-instruction data, which is used by the processor. Memory system 112 may be further distributed and associated with different CPUs or sets of CPUs, as is known in any various so-called non-uniform memory access (NUMA) computer architectures.

The memory system 112 may store all or a portion of the components and data shown (e.g., test case module 146, page table 148, and segment table 150). These programs and data structures are illustrated in FIG. 1 as being included within the memory system 112 in the computing device 100; however, in other embodiments, some or all of them may be on different computer systems and may be accessed remotely, e.g., via a network 130. The computing device 100 may use virtual addressing mechanisms that allow the programs of the computing device 100 to behave as if they only have access to a large, single storage entity instead of access to multiple, smaller storage entities. Thus, while the components and data shown in FIG. 1 are illustrated as being included within the memory 112, these components and data are not necessarily all completely contained in the same storage device at the same time. Although the components and data shown in FIG. 1 are illustrated as being separate entities, in other embodiments some of them, portions of some of them, or all of them may be packaged together.

In some embodiments, the memory system 112 may include a test case module 146, a page table 148, and a segment table 150. The test case module 146 may be a module that identifies whether there are any stale entries within an address translation cache, as described in more detail below. In some embodiments, the test case module 146 is a part of the computing device 100 operating system. A page table (also known as a page map) is a data table structure stored in the memory system 112 that is utilized by a virtual memory system to store mappings of the low-order bits of virtual addresses to the low-order bits of physical addresses. A segment table is a data table structure stored in the memory system 112 that is utilized by a virtual memory system to store mappings from the high-order bits effective addresses to the high-order bits of virtual addresses.

In an embodiment, the components and data shown in FIG. 1 may include instructions or statements that execute on the processors 106 and/or 132 or instructions or statements that are interpreted by instructions or statements that execute the processors 106 and/or 132 to carry out the functions as further described below. In another embodiment, the components shown in FIG. 1 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different ways, including using various computer applications, routines, components, programs, objects, modules, data structures etc., which may be referred to herein as "software," "computer programs," or simply "programs."

Figure 2:
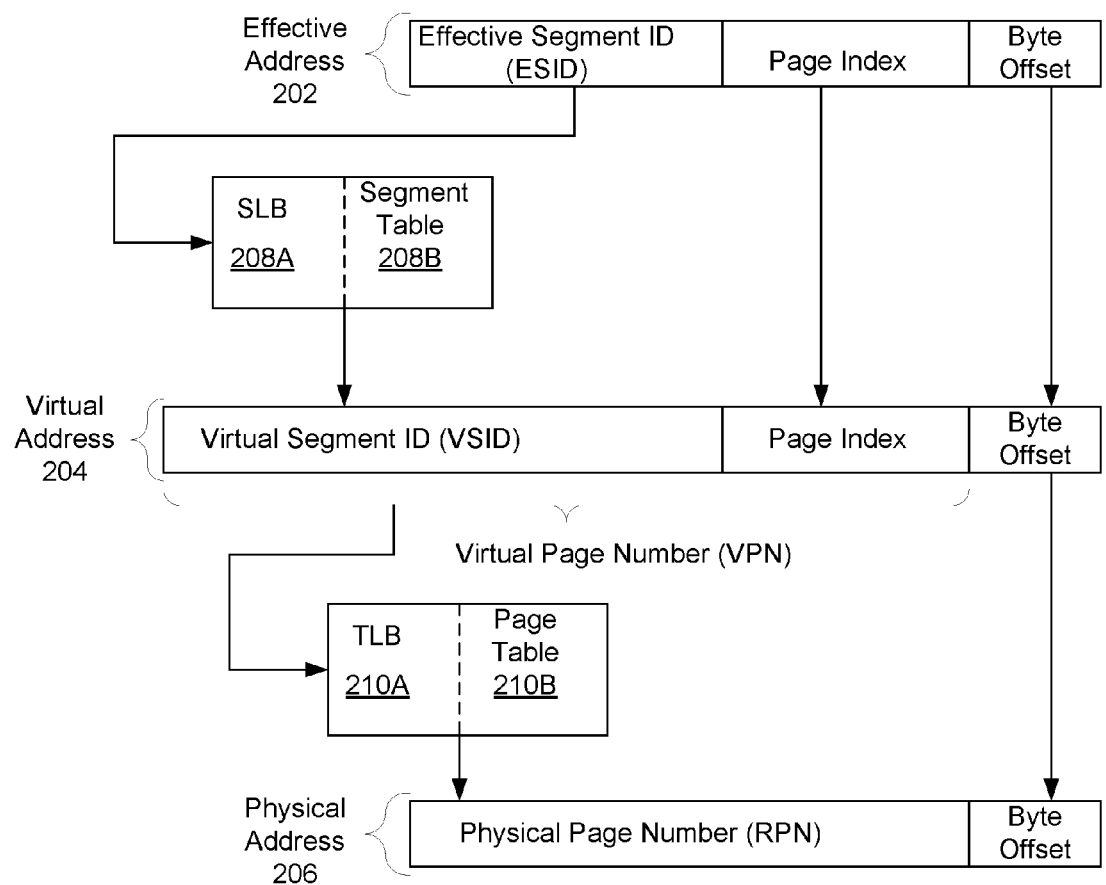
FIG. 2 is an example diagram illustrating how addresses are translated in a virtual memory system, according to embodiments.

FIG. 2 is an example diagram illustrating how addresses are translated in a virtual memory system, according to embodiments. FIG. 2 includes an effective address 202 (that comprises an Effective Segment ID (ESID), a page index, and byte offset), an SLB 208A, a segment table 208B, a virtual address 204 (that comprises a virtual segment ID (VSID), page index, and byte offset), a TLB 210A, a page table 210B, and a physical address 206 (that includes a physical page number (also referred to herein as a real page number or RPN) and a byte offset).

In some embodiments, address translation in FIG. 2 may start when a request for data within memory is made. A program may first reference memory using the effective (logical) address 202 (e.g., 64 bits) computed by a processor when it executes a load, store, branch or cache instruction, etc. Each process may process may include its own unique effective address space. This allows every process to run as though it is the only process running on the system and has all required memory resources available. In order to translate the effective address 202 to the virtual address 204, the operating system or other component may perform a table lookup within the SLB 208A and, if needed, the segment table 208B. The SLB 208A and/or segment table 208B within main memory may include at least two fields—an ESID field and VSID field. Accordingly, the operating system or other component may translate the effective address 202 to the virtual address 204 by first searching within the SLB for the ESID. If the particular ESID is within the SLB (a hit), then the ESID indicates the mapped or corresponding VSID. If the ESID is not within the SLB (a miss), then the operating system or other component may search the main memory within the segment table 208B for the ESID. If the ESID is within the segment table (a hit), then the ESID indicates the mapped VSID. If the ESID is not within the SLB 208A or segment table 208B (a miss), the ESID in some cases may be paged into main memory from a storage device (e.g., disk) and the main memory segment table (and SLB) may accordingly be updated.

If the ESID is found within the SLB 208A or segment table 208B, then the virtual address 204 may be obtained. A virtual address may be an intermediate address that is generated by the processor or processor core (or hypervisor) during the address translation process by concatenating a VSID, a page index, and a byte offset. As discussed above, the VSID may be obtained from the SLB 208A or segment table 208B. The page index of the virtual address 204 may be obtained from the page index of the effective address 202. Likewise, the byte offset of the virtual address 204 may be obtained from the byte offset of the effective address 202. The byte offset in FIG. 2 may indicate where a location is within a particular page.

The VSID and page index, in some embodiments, comprise the virtual page number (VPN). In order for the virtual address 204 to be translated to the physical address 206, a hypervisor or other component may search for a particular VPN within the TLB 210A, and, if not found in the TLB 210A, the page table 210B. The TLB 210A and page table 210B may both include at least two fields (not shown in FIG. 2). A first field may include the VPN and a second field may include a corresponding RPN. Accordingly, if the VPN of the virtual address 204 is located (a hit), then its corresponding RPN may be located. In some embodiments, the hypervisor or other component may first search the TLB 210A for the VPN. If the VPN is not within the TLB 210A (a miss), then the hypervisor or other component may search within the page table 210B. If the VPN is not within the page table 210B (miss), then a page fault may occur and the page corresponding with the VPN may be loaded into main memory (RAM) from a hard drive or non-volatile memory and the memory page table may be updated with the VPN and corresponding RPN.

If the VPN is found within the TLB 210A or page table 210B, then the physical address 206 may be obtained. A physical address may be a final address that is generated by the processor or processor core (or hypervisor) during the address translation process. As discussed above, the VSID may be obtained from the SLB 208A or segment table 208B. The page index of the physical address 206 may be obtained from the page index of the virtual address 204. Likewise, the byte offset of the physical address 206 may be obtained from the byte offset of the virtual address 204. After the physical address 206 is obtained, it may be transmitted to a memory subsystem and may be utilized to access memory and devices (e.g., Peripheral Component Interconnect Express (PCIE) devices). A physical address may correspond to some physical resource in the system, such as an address in Random Access Memory (RAM).

Figure 3:
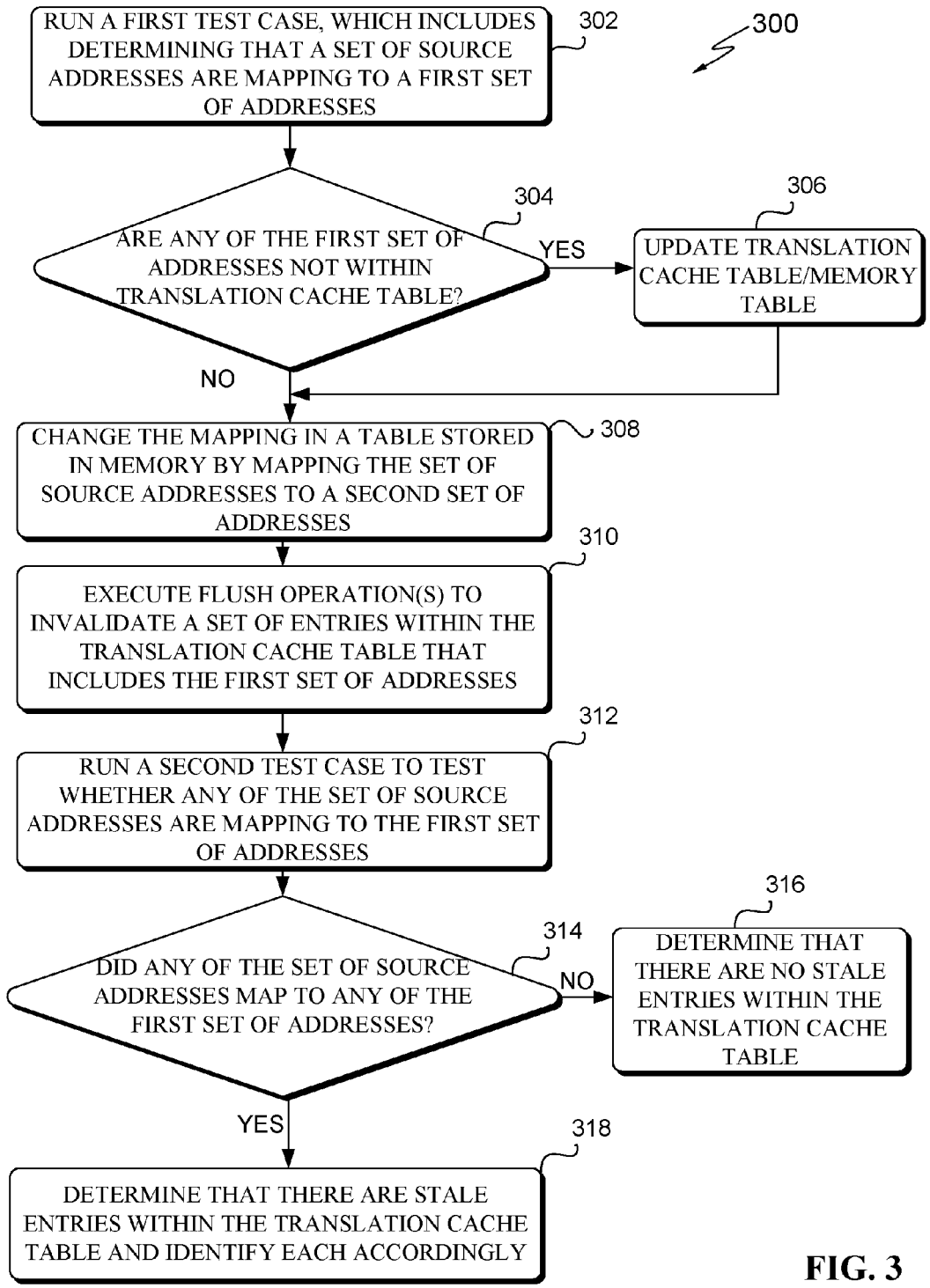
FIG. 3 is a flow diagram of an example process for identifying stale entries within address translation cache, according to embodiments.

FIG. 3 is a flow diagram of an example process 300 for identifying stale entries within address translation cache, according to embodiments. In some embodiments, the process 300 may begin at block 302 when an operating system or other module (e.g., test case module 146 of FIG. 1) runs a first test case, which includes determining that a set of source (i.e. beginning, higher level, etc.) addresses are mapping to a first set of addresses. A "test case" as described herein may refer to a set of variables or conditions under which a tester (e.g., an operating system, a user, program module, etc.) may determine whether a system under the test satisfies requirements or works correctly. Test cases may include such information as preconditions, a set of input values, a set of expected results, how to execute and check results, and/or expected post conditions, or any other suitable information. The test case in FIG. 3 may be utilized to test what particular set of addresses the source addresses are mapping to. Test cases are described in more detail below. In some embodiments, the first set of addresses are virtual addresses. Accordingly, an SLB or segment table may be utilized to determine a virtual address, as described above. In some embodiments, the first set of addresses (and second set of addresses) are physical addresses (e.g., RPNs). Accordingly, a TLB or page table may be utilized to determine a physical address, as described above. Likewise, the set of source addresses may either be effective addresses or virtual addresses. The term "set of" as disclosed herein may mean one or more of. The process 300 may be performed at any suitable time, such as to boot up, every time there is a context switch, at timed intervals, and/or when a new system is being tested prior to shipping, etc.

In an example illustration, the operating system may access or select 20 effective addresses to begin the first test case. Address selection to perform test cases may be performed in various manners. For example, the operating system may randomly select a particular quantity of addresses (e.g., addresses 10, 20, 50, etc.) until all the addresses are selected for testing. Alternatively, the operating system may select batched addresses in a particular order, e.g. consecutive. For example, the first 30 effective addresses may be selected for the first test case at a first time. At a second time, the next 30 effective addresses may be selected for another test case and so on until all of the addresses are selected for testing. In some embodiments, address selection may be time-based. For example, 20 addresses may be selected every 5 minutes until each address is tested.

Per block 304, the operating system and/or processor may determine whether any of the first set of addresses are not within an address translation cache table (e.g., TLB, SLB, etc.). Per block 306, if any one of the first quantity of addresses are not within a translation cache table, then the operating system and/or processor may update the address translation cache table or memory table (i.e., page table/ segment table), which may depend on the level of the miss. For example, if the set of source addresses was a virtual address and if the first set of addresses were not within TLB, but within a page table, an entry may be added to the TLB to reflect the mapping of the first set of addresses from a set of virtual source addresses to a set of physical addresses. However, if the first set of addresses were neither within the TLB or the page table, a fault may occur such that the address may be paged in from disk and read only into the memory page table. In some embodiments, if any of the first set of addresses were never written to TLB (or SLB), then the processor, operating system, and or module (e.g., test case module 146 of FIG. 1) may mark or flag the addresses such that these addresses will not be included in test cases because test cases may identify stale entries within the address translation caches only.

Per block 308, the operating system (e.g., test case module 146) and/or processor may change the mapping specified in block 302 by mapping the set of source addresses to a second set of addresses within a table stored in memory (e.g., page table or segment table). Changing the first set of addresses to a second set of addresses for a set of data may effectively simulate a context switch. Accordingly, the address space (e.g., virtual or effective) of the first set of addresses switches or changes address mappings, which causes the first set of addresses to change to a second set of addresses during address translation for a set of data. For example, the first set of addresses may include a first real page that was previously mapped to by a first virtual address (source address) within a page table. The second set of addresses may include a second real page that is now mapped to by the first virtual address within the page table. As discussed above, when switching from one process to another, the hardware and/or operating system should ensure that the about-to-be-run process does not accidently utilize address translations from some previously run process. Block 308 may therefore force one or more processors to initiate a flush operation in response to the changing of addresses. The changing of addresses is described in more detail below. In some embodiments.

Per block 310, the operating system and/or the processor may execute or initiate, in response to the changing a mapping, a flush operation (or series of flush operations) to invalidate one or more entries within the address translation cache table. For example, when a first processor performs an operation to flush a test address it's TLB, it may send a flush request to a second processors requesting that the second processor flush the test address from the second processor's TLB. The entries may correspond with each of the first set of addresses and therefore be considered stale entries that are no longer valid for address translation. In some embodiments, the flush operation(s) may include flushing an entire address translation cache. In other embodiments, the flush operation may include flushing only those entries within the address translation cache that are the stale entries (i.e., the first set of addresses). In some embodiments, a single processor or processor core may initiate each of the flush operations associated with each of the first quantity of addresses. In some embodiments, two or more processors (or processor cores) may initiate each of the flush operations associated with each of the first set of addresses substantially simultaneously. For example, if the first set of addresses included address 1 (corresponding to TLB entry 1), address 2 (corresponding to TLB entry 2), and address 3 (corresponding to TLB entry 3), a first processor (or core) may initiate a first flush operation to flush TLB 1, a second processor (or core) may initiate a second flush operation to flush TLB 2, and a third processor (or core) may initiate a third flush operation to flush TLB 3. In some embodiments, each of the flush operations may occur substantially simultaneously (e.g., in parallel) resulting in a race condition, as described above, in order to determine whether there are any stale entries within address translation cache.

In some embodiments, the executing of the one or more flush operations are in response to the processor or processor core issuing a tlbie (Translation Lookaside Buffer Invalidate Entry) instruction. The tlbie instruction issued by a first processor or core to other processors makes a TLB entry invalid in the other processor's TLB for a subsequently requested effective-to-physical address translation or a subsequently requested effective-to-virtual-to-physical address translation. In some embodiments, a TLB shootdown may also include an issuance of an inter-processor interrupt that causes the local invalidation of a TLB entry. If a processor issues a tlbie instruction, other processors receive a message that indicates the issuance of the tlbie instruction. That message may also include a page size and a page starting address, corresponding to the page to be invalidated.

Per block 312, the operating system (e.g., test case module 146) and/or processor may run a second test case to test whether any of the set of source addresses are mapping to the first set of addresses (i.e., the invalid addresses). The running of the second test case may include checking a "results" section of the second test case, which specifies whether any of the set of source addresses are mapping to the first set of addresses. Test cases are discussed in more detail below. Per block 314, the operating system (e.g., test case module 146) and/or processor may determine whether any of the set of source addresses map to any of the respective first set of addresses (e.g., whether any virtual address of the set of source addresses were mapping to a RPN specified in the first test case) in any of the respective SLBs and TLBS associated with each of two or more processors. Per block 316, if none of the first set of addresses were accessed or mapped to during the second test case, then the operating system (e.g., test case module 146) and/or processor may determine that there are no stale entries within the address translation cache (e.g., all of the entries were successfully invalidated). For example, if each of the set of source addresses in the second test case is mapped to the pages specified in the second test case (i.e., the pages that were changed per block 308), then all of the entries within address translation cache may have been successfully invalidated and the mappings may have been derived from a correctly updated memory table (e.g., page table or segment table).

Per block 318, if any of the first set of addresses were accessed or mapped to during the second test case, then the operating system (e.g., test case module 146) and/or processor may determine that there is at least one stale entry within at least one of the address translation cache tables. The determination at block 318 may be an inference that there are stale entries because the operating system and/or processor in block 308 changed the real (or virtual) addresses of each of the first set of addresses for address translation within a table stored in memory (e.g., page table). Accordingly, any of the set of source addresses should have mapped to the changed addresses (second set of addresses) instead of the first set of addresses not only within a page table or segment table, but also within the address translation caches. The operating system (e.g., test case module 146) and/or processor may identify whether there are any stale entries by comparing the first test case with the second test case. For example, a tester (e.g., test case module 146 or user) may run the first test case and see that a source address maps to a first physical address. However, if the tester runs a subsequent second test case and sees that the source address still maps to the first physical address in one or more caches (even after simulating a context change in block 308), then the tester may identify the first physical address as being the address that contains a corresponding stale entry in an address translation cache. Therefore, any address that mapped to a page that was specified in the first test case may mean that the processor or core associated with the cache did not receive or process the flush operation for the first address in order to clear its address translation cache notwithstanding that an actual change was made in an associated page table structure.

Figure 4A:
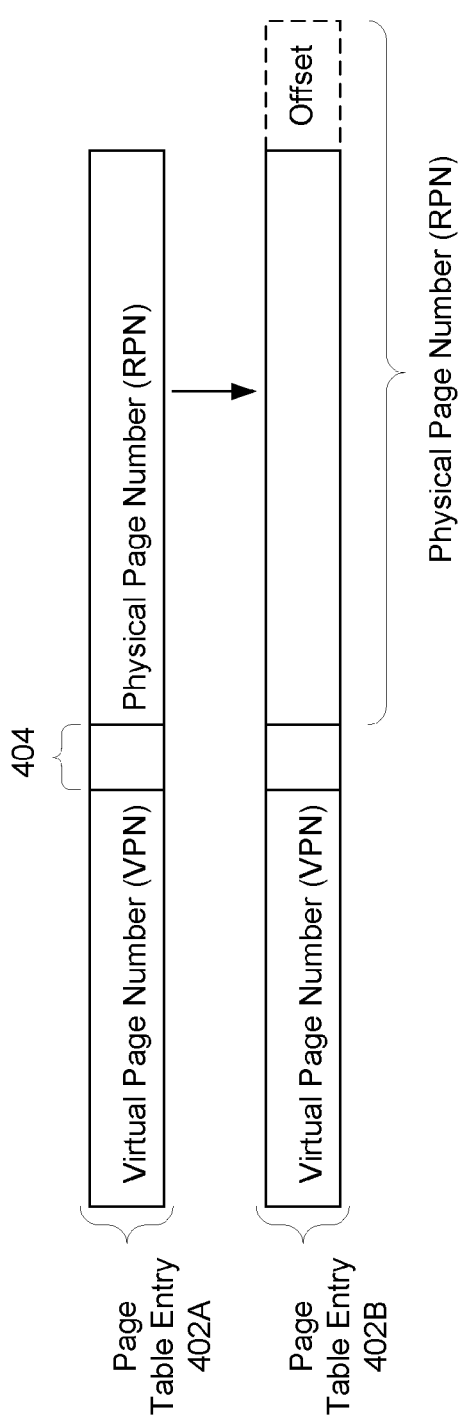
FIG. 4A is a diagram of an example page table entry illustrating how a physical address may be changed, according to embodiments.

FIG. 4A is a diagram of an example page table entry illustrating how a physical address may be changed (e.g., block 308 of FIG. 3), according to embodiments. FIG. 4A includes a page table entry 402A, which includes a Virtual Page Number (VPN), additional bits 404 (e.g., protection bit, valid bits, dirty bits, referenced bits, etc.), and a Physical Page Number (RPN). FIG. 4A further includes the page table entry 402B, which may be the page table entry 402A after page table entry 402A has received an address change. Page table entry 402B may include a Virtual Page Number (VPN), additional bits, and a Physical Page Number (RPN), which includes an offset in order to make the RPN a larger size. The operating system or other component may provide the offset by masking and specifying what particular set of bits need to be set, which may determine how many bits are being added to the RPN for page table entry 402B. In some embodiments, the operating system or other component may add the offset within the RPN (e.g., zero out a defined set of bits within RPN) such that the RPN is smaller for page table entry 402B when compared to the RPN of page table entry 402A. As discussed above, the operating system or other component may change the RPN in order to effectively change a context, which may require one or more TLB flush operations to occur. Accordingly, page table entry 402A may be the page table entry the first test case utilizes. Page table entry 402B may be the page table entry the second test case test utilizes in order to identify stale entries within TLB, as discussed above.

In an example illustration, the RPN of page table entry 402A may be 3B9AC00h, which may be 1 GB. In order to change the mapping from the VPN of page table entry 402A to the RPN of page table entry 402B to make the RPN larger, the operating system may add a known offset such as 3B9AC00h (e.g., 1 GB), which now makes the RPN of table entry 402B 77359400h (2 GB) instead of 3B9AC00h (e.g., the RPN of table entry 402A). Accordingly, when the RPN has changed within the page table entry, the VPN will now point to a different RPN. In a page table full of several entries, the operating system may increment each RPN table entry with the same offset (i.e., a fixed offset). For example, using the illustration above, another page table entry RPN may have originally been 3B9AC00h, which may be 1 GB, plus an addition of 3E800h, which may be 256 k. With the same offset of 3B9AC00h (e.g., 1 GB) added to each entry, the RPN may be 77359400h plus 3E800h or 3B9EB200h (e.g., 2 GB plus 256 k).

Figure 4B:
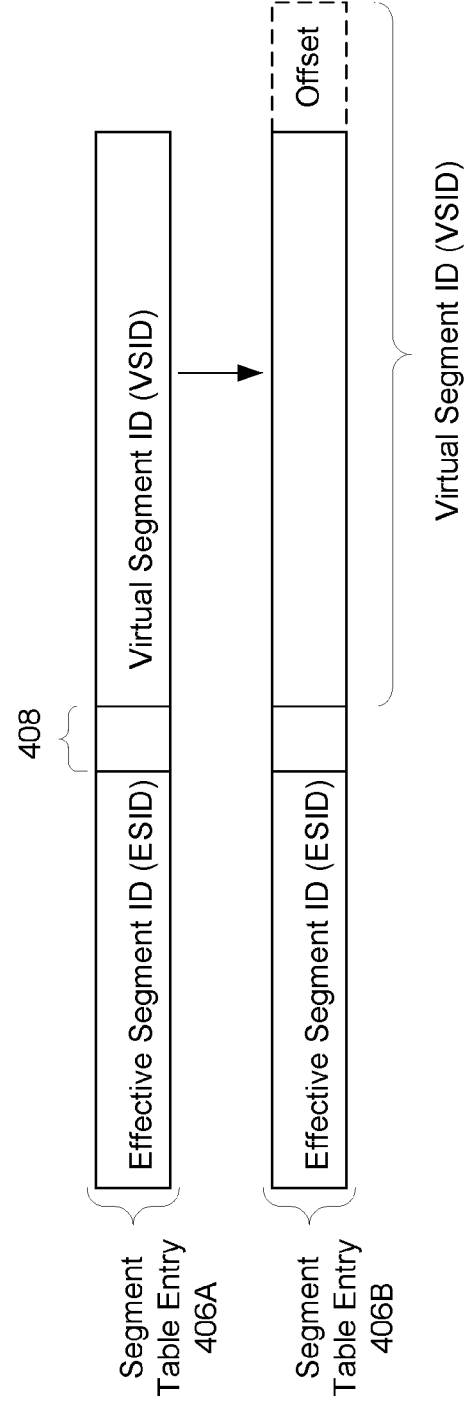
FIG. 4B is a diagram of an example segment table entry illustrating how a virtual address may be changed, according to embodiments.

FIG. 4B is a diagram of an example segment table entry illustrating how a virtual address may be changed (e.g., block 308 of FIG. 3), according to embodiments. The same or analogous principle illustrated in FIG. 4A to change pages may also be applied to intermediate page levels (e.g., virtual pages). FIG. 4B includes segment table entry 406A, which may include an Effective Segment ID (ESID), additional bits 408, and a Virtual Segment ID (VSID). FIG. 4B may also include segment table entry 406B, which may be the segment table entry 406A after an address change has been made. Segment table entry 406B may also include a VPN, additional bits, and am ESID and VSID, which includes an offset in order to make the VSID a larger size. The operating system or other component may provide the offset by masking and specifying what particular set of bits need to be set, which may determine how many bits are being added to the VSID for segment table entry 406B. In some embodiments, the operating system or other component may add the offset within the VSID (e.g., zero out a defined set of bits within VSID) such that the VSID is smaller for segment table entry 406B when compared to the VSID of segment table entry 406A. As discussed above, the operating system or other component may change the VSID in order to effectively change a context, which may require one or more SLB flush operations to occur. Accordingly, segment table entry 406A may be the segment table entry the first test case utilizes. Segment table entry 406B may be the segment table entry the second test case test utilizes in order to identify stale entries within SLB, as discussed above.

The page table entries 402A and/or 402B may illustrate a simplistic view of such entries, and may include more or less bit fields with different page table configurations than illustrated. For example, the page table to which to page table entries 402A and/or 402B belong to may be inverted page tables, multilevel page tables, virtualized page tables, nested page tables, or any other type of page table.

FIG. 5 is a diagram of an example of two test cases, according to embodiments. The table 500 illustrates two test cases, test case numbers 1A and 1B. In some embodiments the test cases 1A and 1B may test whether there are stale entries within a TLB, as illustrated in FIG. 5. In other embodiments however, the test cases 1A and 1B may test whether there are stale entries within SLB. The two test cases may include various fields (i.e., columns) such as: a "test case ID" field, a "description" field, a "preconditions" field, a "steps" field, an "expected results" field, and an "actual results" field. The table 500 and test cases may include more or less fields than illustrated in FIG. 5. For example, the table may include additional fields such as a "pass/fail" field, a "post conditions" field, a "status" field, etc. Although each of the test cases 1A and 1B illustrates textual prose descriptions within each field, in some embodiments, the descriptions in each field may be described by symbols, numbers, and/or other shorthand representations.

The "description" field may indicate a goal of the test case, which for test case 1A may be to identify a first set of RPNs for a first set of virtual (source) addresses. The "preconditions" field may indicate any conditions or requirements that must occur before the test case is initiated or completed. For test case 1A, the precondition may be that the computing system should be in virtual memory mode such that address translation will be utilized. The "steps" field may indicate the steps required to complete a test case. For test case 1A, the first step may be to access a first set of virtual addresses. In order to access the first set of virtual addresses, an effective address is translated (e.g., via a SLB or segment table) to the virtual address. The second step may include identifying the set of RPNs for each of the first set of virtual addresses. Specifically, when a virtual address is translated to a physical address, the VPN of the virtual address will map (e.g., via the TLB or page table) to a particular RPN. Accordingly, the second step may be to identify each of the address space mappings of virtual addresses to the RPNs of the physical addresses. The "expected results" field may indicate what the results should be, and according to test case 1A, the expected results are that each of the first set of virtual addresses should map to the first set of RPNS within a page table and within a TLB. The "actual results" (i.e., observed results) may be that each of the first set of virtual addresses mapped to the first set of RPNS in each of the page tables and address translation caches.

For test case 1B, the "description" field may be to identify a second set of RPNs for the same first set of virtual (source) addresses. There may be at least 2 "preconditions" for test case 1B. The first preconditions may be that the first set of RPNS for the first set of virtual addresses (accessed in test case 1A) should have been changed (or the appropriate commands should have been issued to change a mapping) to a second set of RPNS in a page table. Accordingly, the first precondition may specify that a mapping change (virtual to physical addresses) occurred for the first set of virtual addresses such that the physical addresses are now different within the page table. In some embodiments, when the physical addresses are changed within a page table (or segment table), then the same change is made within a TLB (or SLB). In an example illustration, referring back to FIG. 4A, the first set of RPNs may correspond to the RPN of page table entry 402A and the second set of RPNs may correspond to the RPN of page table entry 402B, which has received an offset to change the RPN (which changes the physical address or mapping from the source address). In some embodiments, the first precondition in the second test case 1B (i.e., the changing a mapping) is a part of the second test case 1B instead of a precondition. The second precondition may be that a TLB flush command has been issued for each entry associated with each of the first set of RPNs (i.e., the RPNs that were mapped to during the first test case) in each of the address translation caches. As discussed above, the TLB flush operations may be executed simultaneously and because a race condition may occur, stale TLB entries may still be contained in a TLB even though address mappings have changed within a page table. In some embodiments the second precondition for test case 1B (i.e., the TLB flush operation) is a part of the test case 1B instead of a precondition to test case 1B.

The first step for test case 1B may be to access the first set of virtual addresses (from test case 1A). The second step may be to identify the set of RPNs for each of the first set of virtual addresses. Accordingly, the RPNs that each of the first set of virtual addresses have mapped to may be observed (e.g., within a TLB). For the expected results, it is expected that none of the first set of virtual addresses should map to the first set of RPNs, but instead each of the first set of virtual addresses should map to the second set of RPNs. This may be the expected result because of the precondition of changing the mapping of each of the first set of virtual addresses from the first set of RPNs to the second set of RPNs within a page table. However, given the second precondition of the TLB flush operation, if there are stale entries within one TLB or two or more TLBs, then the associated first set of virtual addresses will map to the corresponding first set of RPNs, instead of the corresponding second set of RPNs (e.g., within a TLB). This may occur because a system may first look into address translation cache, as opposed to a table in memory (e.g., page table), and if an entry was not flushed, the invalid mapping will be utilized within the address translation cache instead of the valid mapping stored in memory (i.e., the mapping changed as part of precondition 1 of test case 1B). For example, an invalid TLB entry may have been inadvertently retained such that a virtual address is being translated to the old physical address (which includes the first set of RPNs) contained in a TLB instead of the new physical address (which includes the second set of RPNs) contained in a page table. According to the "actual results" of the test case 1B, one address of the first set of virtual addresses, e.g., address X, may have been mapped to a physical address in the first set of RPNs. Therefore, virtual address X may be associated with an entry within a TLB that is stale or invalid.

In some embodiments, the table 500 and the test cases 1A and 1B may represent test cases to test whether there are stale entries within a SLB, as opposed to a TLB. Accordingly, for example, for test case 1A, the description may be to identify a first set of VSIDs (or virtual addresses) for a first set of ESIDs in one or more segment tables. The steps should include, first, accessing a first set of effective addresses (or ESIDs). The second step may include identifying the set of VSIDs for each of the first set of ESIDs. The expected results may be that each of the first set of ESIDs should map to the first set of VSIDs. The actual results may be that each of the first set of ESIDs may map to the first set of VSIDs.

For the second test case 1B, the description may be to identify a second set of VSIDs for the same (first) set of ESIDs. The first precondition of test case 1B may be that the first set of VSIDs within the segment table for the first set of ESIDs should be have been changed to a second set of VSIDs within a segment table in memory. The first precondition may be an actual part of the test case 1B. The second precondition may be that an SLB flush operation commands should have been issued for each of the first (or second) VSIDs in one or more SLBs. The second precondition may be an actual part of the test case 1B. The steps for test case 1B should be first to access the first set of ESIDs (e.g., as illustrated in FIG. 2). The second step may be to identify the set of VSIDs for each of the first set of ESIDs. The expected results may be that none of the ESIDs in the first set of ESIDs should map to the first set of VSIDs (because of the change in the segment table as specified in the precondition), but the first set of ESIDs should map to the second set of VSIDs. The actual results may be that one of the first set of ESIDs mapped to one of the first set of VSIDs in one or more of the SLBs, which may mean that there may be one or more stale entries within a SLB.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for identifying stale entries within an address translation cache, the system comprising:
    a computing device having a processor; and
    a computer readable storage medium having program instructions embodied therewith, the program instructions readable/executable by the processor to cause the system to perform a method, the method comprising:
    running, by the computing device, a first test case, the first test case to determine which particular set of physical addresses a first set of virtual addresses are mapping to, the running of the first test case including determining that the first set of virtual addresses are mapped to a first set of physical addresses;
    changing, by the computing device, a mapping in a page table stored in memory, the page table mapping the first set of virtual addresses, for a set of data, to the first set of physical addresses, the changing of the mapping including mapping the first set of virtual addresses to a second set of physical addresses, wherein the changing a mapping includes adding an offset quantity of bits to the first set of physical addresses;

executing, by the computing device and in response to the changing of the mapping, one or more flush operations to invalidate one or more entries within one or more Translation Lookaside Buffer (TLB) address translation caches, the one or more entries corresponding to the first set of physical addresses, the TLB address translation caches being buffers within a processor that maps virtual addresses to physical addresses for address translation;

running, by the computing device and in response to the executing of the one or more flush operations, a second test case, the second test case to test whether any of the first set of virtual addresses are mapping to the first set of physical addresses;

determining, by the computing device and based on the second test case, that at least one of the first set of virtual addresses are mapping to at least one of the first set of physical addresses;

determining, by the computing device and based on comparing the first test case with the second test case, that at least one of the one or more entries were not invalidated by the one or more flush operations;

running, by the computing device, a third test case, the third test case to determine which particular set of virtual addresses a first set of effective addresses are mapping to, the running of the third test case including determining that the first set of effective addresses are mapped to a second set of virtual addresses;

changing, by the computing device, a mapping in a segment table stored in the memory, the segment table mapping the first set of effective addresses, for a second set of data, to the second set of virtual addresses, the changing of the mapping including mapping the first set of effective addresses to a third set of virtual addresses, wherein the changing a mapping in the segment table includes adding an offset quantity of bits to the second set of virtual addresses;

executing, by the computing device and in response to the changing of the mapping in a segment table, one or more flush operations to invalidate one or more entries within one or more Segment Lookaside Buffer (SLB) address translation caches, the one or more entries within the one or more SLB address translation caches corresponding to the second set of virtual addresses, the SLB address translation caches being buffers within the processor that maps effective addresses to virtual addresses for address translation;

running, by the computing device and in response to the executing of the one or more flush operations to invalidate one or more entries within one or more SLB address translation caches, a fourth test case, the fourth test case to test whether any of the first set of effective addresses are mapping to the second set of virtual addresses;

determining, by the computing device and based on the fourth test case, that at least one of the first set of effective addresses are mapping to at least one of the second set of virtual addresses;

determining, by the computing device and based on comparing the third test case with the fourth test case, that at least one of the one or more entries of within the one or more SLB address translation caches were not invalidated; and wherein the first test case, the second test case, the third test case, and the fourth test case each share a plurality of fields that are displayed by the computing device, the plurality of fields including: a first field identifying a description of each of the test cases, a second field identifying one or more preconditions needed in order to start each of the test cases, a third field identifying one or more steps needed to complete each of the test cases, a fourth field identifying one or more expected results for each of the test cases, and a fifth field identifying one or more actual results for each of the test cases.

\* \* \* \* \*